United States Patent Office 2,866,752
Patented Dec. 30, 1958

2,866,752
METHOD OF DESULFURIZING HYDROCARBON OIL USING A NICKEL TITANATE CATALYST

Wilford J. Zimmerschied, Crown Point, Ind., and Paul N. Rylander, Chicago, Ill., assignors to Standard Oil Company, Chicago, Ill., a corporation of Indiana No Drawing. Application March 29, 1956
Serial No. 574,584

6 Claims. (Cl. 208—217)

This invention relates to the desulfurizing of hydrocarbon oils and in particular it concerns the use of novel catalysts for the hydrodesulfurization of hydrocarbon oils containing organic sulfur compounds.

Petroleum or other hydrocarbon oils which contain appreciable amounts of sulfur compounds are objectionable for use as fuel, lubricating oils, solvents, or cracking stocks and the like. Frequently virgin and cracked naphthas must be desulfurized before blending into gasoline or before further processing, such as hydroforming, to improve their octane number. The high sulfur components, e. g. coke still naphtha, of gasoline require desulfurization in order to produce a blended gasoline meeting the requirement of low sulfur content. A number of catalysts are available for the hydrodesulfurization of virgin naphthas, but if they are employed in hydrodesulfurizing olefinic naphthas such as thermally or catalytically cracked naphthas, they catalyze indiscriminate desulfurization and hydrogenation of the higher octane olefins to produce lower octane paraffins. The olefinic naphthas, e. g. coke still naphtha, may suffer a loss of 10 to 20 octane numbers. In addition, a considerable amount of expensive hydrogen is used in saturating the olefins.

An object of this invention is to provide a method and means for desulfurizing hydrocarbon oils which utilizes a highly active and effective hydrodesulfurization catalyst. Another object is to provide a selective desulfurization catalyst useful for desulfurizing olefinic hydrocarbon oils with a minimum consumption of hydrogen. An important object of this invention is to provide an economical method and means for achieving a high degree of desulfurization of olefinic naphthas while maintaining saturation, i. e. hydrogenation, of the olefinic components at a minimum and thereby obtaining a desulfurized olefinic naphtha whose octane number has not been substantially reduced during hydrodesulfurization. Other objects will become apparent from the detailed description of our invention.

It has been found that nickel meta-titanate ($NiTiO_3$), is a highly effective and selective desulfurization catalyst. It is prepared by calcining at a temperature between about 1400° and 2000° F., e. g. 1550° to 2000° F. for 1 to 24 hours, an intimate mixture of a nickel compound which affords nickel oxide and a titanium compound which affords titanium oxide at the calcination temperatures. Thus nickel oxide, nickel hydroxide, etc. may be intimately mixed with titanium oxide, titanium hydroxide, etc. in amounts such that the molar ratio of nickel to titanium in the mixture is between 0.5:1 and 3:1. The intimate mixture, which is then calcined at the highly elevated temperature to convert it to nickel meta-titanate, is then used to desulfurize the hydrocarbon oil. Hydrodesulfurization conditions of 600° to 1000° F. in the presence of hydrogen, usually about 500 to 5000 s. c. f. $H_2$/bbl. of oil, operating pressures between 100 and 3000 p. s. i. g., and space velocities between 0.5 and 20 liquid volumes of oil/hour/volume of catalyst may be used. The catalsyt is very useful in desulfurizing petroleum naphthas, especially olefinic naphthas such as coke still naphtha.

Nickel meta-titanate is a canary yellow solid. It is rhombohedral in structure and has a specific gravity of 5.08. X-ray defraction patterns reveal that it has a hexagonal cell system, the $a$ axis being 5.050° A. and the $c$ axis being 13.84° A. The unit cell contains 6 molecules of $NiTiO_3$ having a space grouping of $$\frac{c^2}{3i}$$

As has heretofore been indicated, the nickel meta-titanate is prepared by calcining nickel and titanium compounds which afford their oxides at the elevated calcination temperatures of 1400° F. and higher which are employed. As examples of various nickel compounds which can be used in preparing nickel meta-titanate are: NiO; $Ni_2O_3$; $Ni_3O_4$; $Ni_3O_4 \cdot 2H_2O$; $Ni(OH)_3$; $Ni(OH)_2 \cdot \frac{1}{4}H_2O$;

$NiCO_3$; $2NiCO_3 \cdot 3Ni(OH)_2 \cdot 4H_2O$; $NiCl_2 \cdot 6H_2O$;

$Ni(HCO_2)_2 \cdot 2H_2O$ (nickel formate); $Ni(C_2H_3O_2)_2$ (nickel acetate). Examples of various titanium compounds which may be employed are: $Ti(OH)_3$, $Ti(OH)_4$, $H_2TiO_3$, $H_4TiO_4$, TiO, $Ti_2O_3$, $TiO_2$, and $TiO_3$. A highly satisfactory mixture to use is one which contains $NiCO_3$ and $TiO_2$. Mellor's "Comprehensive Treatise on Inorganic and Theoretical Chemistry," vol. 7, page 60 (1927), discloses methods of preparing nickel meta-titanate. The mixture which is calcined at the highly elevated temperature should contain a molar ratio of nickel to titanium which is between 0.5:1 and 3:1. If lower molar ratios of nickel to titanium are used, the calcination product (which contains nickel meta-titanate) is much less effective as a desulfurization catalyst, perhaps due to the excess of titanium oxide which is present.

The nickel compound and the titanium compound, in the desired proportions, are intimately mixed before being calcined. This may be done by ball milling the particular nickel and titanium compounds in the dry or wet state, preferably the latter. For example, a water or methanol slurry of the mixture may be ball milled. After an intimate mixture is obtained, the water, methanol, or whatever slurrying medium is used, is vaporized in a separate step or during the early stages of the calcination. While this intimate mixture may be calcined at a temperature between about 1400 and 2000° F., the temperature is preferably between 1550° and 2000° F. In order to obtain the highly effective desulfurization catalyst of this invention, it is essential that the calcination be carried out at the prescribed elevated temperatures. If the calcination is carried out at a much lower temperature, or if the mixture of the nickel and titanium compound are not calcined (heated) at all, the product mixture will have only weak and unsatisfactory ability to catalyze hydrodesulfurization. The calcination time may be between 1 and 24 hours or more, suitably 3 to 18 hours. Because the catalytic material is produced at such an elevated temperature and is stable at such temperatures, it has an inherent advantage over other desulfurization catalysts wherein the temperature of regeneration of the catalyst must be carefully controlled to about 1200° F., or lower to avoid sintering and deactivation.

The calcination product may be used in a desulfurization process in the form of fragments as obtained from the calcination step, or it may be pulverized and pelleted with the aid of 1–2% of Sterotex (hydrogenated corn oil), stearic acid, or the like which are employed as binders and subsequently burned from the pellets. If the catalyst is employed in pelleted form, it can be pelleted together with a carrier such as activated alumina, bauxite, or the like. The various carriers or spacing agents, upon which the calcination product may be extended, can be incorporated in the finished catalyst by pulverizing the carrier material e. g. activated alumina, hydrous alumina gel, commingling it with the pulverized calcination product, then pelleting it with the aid of a binder, and finally burning the binder therefrom with dilute oxygen at a temperature of about 500 to 1000° F. (but not higher than 1200° F.). While the calcination product may be extended upon a carrier material to reduce the cost, there may be instances where it is not desirable to do so since the desulfurization effectiveness is somewhat reduced.

Hydrocarbon oils which may be desulfurized are those such as petroleum and fractions thereof, coal hydrogenation oils, shale oil, and the like which contain objectionable amounts of sulfur compounds, nitrogen compounds and oxygen compounds. The oil may be a virgin or cracked distillate. Virgin or cracked naphthas are particularly suitable feeds to the process of this invention, although higher boiling oils e. g. kerosene, gas oil, etc., may be employed. Olefinic naphthas such as contain an olefin to paraffin ratio in the range of 3:1 to 1:3 are particularly suitable feed stocks because minimum saturation of the olefin content occurs during the hydrodesulfurization process. An outstanding example of a high sulfur olefinic naphtha is a naphtha produced by the coking of a high sulfur reduced crude by conventional methods such as delayed coking or fluidized coking methods. Such a naphtha is exceedingly more difficult to desulfurize by conventional methods than are the olefinic naphthas produced by thermal cracking or by catalytic cracking.

The hydrocarbon oil is desulfurized by passing it together with hydrogen through the reactor containing the catalyst. The catalyst may be contained in the reactor in tubes, trays, or other appropriate containers, or it may be employed in the fluidized state. The conditions employed in desulfurization when using our catalyst will of course vary to some extent dependent upon the type of hydrocarbon oil to be desulfurized and the extent of desulfurization desired. A temperature of 600 to 1000° F. may be used, the higher temperatures being employed in desulfurizating higher boiling feed stocks. When desulfurizing naphtha fractions a temperature of about 600 to 800° F., preferably about 750° F., may be employed. Under such conditions the naphtha is desulfurized while in the vapor state, whereas when desulfurizing a gas oil, a liquid phase is present. A pressure ranging from about 100 to 3000 p. s. i. g. or higher may be employed in the reactor. The oil is contacted with the catalyst in the presence of hydrogen which may be employed in the amount of 500 to 5000, preferably 1500 to 3000 s. c. f./bbl. oil. The hydrogen may consist of introduced outside hydrogen as is employed in a conventional hydrofining type operation, or it may be generated within the reactor by dehydrogenation of the naphthenes present in the feed stock as occurs in "autofining." Space velocities of between 0.5 to as high as 20 volumes of oil per hour per volume of catalyst, preferably between 2 to 10 volumes of oil per hour per volume of catalyst, may be employed.

The higher space velocities are used with the more easily desulfurized stocks such as virgin naphtha, whereas the lower space velocities of about 2 to 5 are employed with the more difficultly desulfurized stocks such as coke still naphtha, higher boiling stocks such as gas oils, and the like.

After the catalyst has been used for a sufficient length of time so that its activity begins to decline, it may be regenerated by burning the hydrocarbonaceous material therefrom employing diluted oxygen such as a mixture of flue gas with air. Because of the thermal stability of the catalyst, the temperature of regeneration need not be kept below 1200° F. as is necessary to avoid deactivation of presently available commercial hydrodesulfurization catalysts. The temperature may be as high as about 1600–1800° F. Regeneration at these higher temperatures is more rapid and the down-time of the hydrodesulfurization unit can be decreased. Not only will the use of our catalyst minimize costly equipment necessary to control regeneration of the catalyst, but it will have the added economic incentive of reducing unit down-time.

The effectiveness of nickel meta-titanate which is produced by calcination of nickel and titanium compounds at 1400° F. and higher was determined and compared with the effectiveness of an uncalcined mixture of the nickel and titanium compounds. The runs made show the importance of calcining the mixture at the highly elevated temperatures which produces the more active nickel-meta-titanate. The catalyst employed in the first run was prepared by mixing 237.4 grams of $NiCO_3$ and 79.9 grams of $TiO_2$ (2:1 molar ratio of Ni:Ti) with sufficient methanol to form a slurry. The slurry was then ball milled for about 3 hours. The intimate mixture produced was removed from the mill, methanol evaporated on a steam bath, and then placed in a muffle furnace and heated at approximately 1550° F. overnight (18 hours). The canary yellow fragments, which X-ray diffraction studies revealed was nickel meta-titanate, was then employed in Run 1. The catalyst employed in the second run was prepared by ball mixing 74.7 grams of NiO and 79.9 grams of $TiO_2$ (equal molar mixture of nickel and titanium). This powdered mixture was then used as such in Run 2. The method of carrying out the hydrodesulfurization runs consisted of placing samples of the catalyst composition (30 cc.) in the center section of an electrically heated 1 inch (I. D.) stainless steel vertical reactor approximately 36 inches long. A glass bead section was employed below the catalyst bed to support it, and glass beads were placed above the catalyst to act as a preheat section for the incoming feed. Coke still naphthas (which were obtained from the delayed coking of a mixture of high sulfur reduced crudes primarily of Texas origin) were employed as feed stocks. The naphtha used in Run 1 was characterized by a sulfur content of 0.541 weight percent and a bromine number of 82.5. The naphtha used in Run 2 was characterized by a sulfur content of 0.604 weight percent and a bromine number of 65. The method of operation consisted of passing the naphtha together with once-through hydrogen (at a rate approximating 2000 s. c. f./bbl. of naphtha) through the top of the down flow reactor. The total effluent was collected in a pressurized receiver and the naphtha condensed therein. The runs were carried out at a temperature of about 750° F., a pressure of 1000 p. s. i. g., and a liquid hourly space velocity of about 2.0. A number of fractions of the desulfurized product naphtha were collected during each run and the sulfur content and bromine number of the fractions were determined. The percentage reduction of the sulfur content and the percentage reduction in the bromine number were calculated. The percentage reduction in the bromine number was expressed as percentage of paraffination. The results obtained with the two described catalytic masses are shown in Table I which follows:

*Table I*

RUN NO. 1

[Catalyst: $NiTiO_3$ (prepared by calcination at 1550° F.).]

| Vol. feed/Vol. catalyst | Percent Desulfurization | Percent Paraffination | Selectivity [1] |
| --- | --- | --- | --- |
| 6.7 | 95 | 73 | 1.3 |
| 14.8 | 92 | 70 | 1.3 |
| 23.0 | 90 | 65 | 1.4 |

RUN NO. 2

[Catalyst: Physical mixture of NiO + $TiO_2$ (non-calcined).]

| Vol. feed/Vol. catalyst | Percent Desulfurization | Percent Paraffination | Selectivity |
| --- | --- | --- | --- |
| 8.3 | 95 | | |
| 25.0 | 70 | | |
| 41.7 | 51 | | |
| 50.0 | 38 | | |

[1] Selectivity = percent desulfurization ÷ percent paraffination

It is evident from the above data that the nickel metatitanate ($NiTiO_3$) retains its high desulfurization activity, whereas the physical mixture of $NiO + TiO_2$ used in Run 2 lost its activity rather rapidly. Thus the catalytic mass used in Run 2 could not practically be used in a desulfurization process. The catalyst used in Run 1 is also quite selective for desulfurization in preference to paraffination of the olefins present in the feed coke still naphtha. This advantage makes it highly useful in desulfurizing olefinic naphthas prior to blending into gasoline, since the olefinic constituents generally have a higher octane number than the corresponding paraffins.

Thus having described our invention what is claimed is:

1. The method of desulfurizing a hydrocarbon oil containing organic sulfur compounds which comprises contacting said oil in the presence of hydrogen at a temperature between about 600° and 1000° F. with a catalyst containing as the essential component $NiTiO_3$ which is prepared by calcining an intimate mixture of a nickel compound affording an oxide of nickel and a titanium compound affording an oxide of titanium, the mixture containing between about 0.5 and 3 mols of nickel per mol of titanium, and the $NiTiO_3$ being formed by heating the mixture at a temperature between about 1400° and 2000° F. for a period of about 1 to 24 hours.

2. The method of claim 1 wherein said catalyst is prepared by heating to a temperature of at least about 1500° F. for a period of about 1 to 24 hours an intimate mixture of a nickel compound affording an oxide of nickel and a titanium compound affording an oxide of titanium, the molar ratio of nickel to titanium in the mixture being about 2:1.

3. The method of claim 1 wherein the $NiTiO_3$ is extended upon a carrier.

4. The method of claim 1 wherein said hydrocarbon oil is a petroleum naphtha.

5. The method of claim 4 wherein said naphtha is an olefinic naphtha.

6. The method of desulfurizing a petroleum naphtha which comprises contacting said naphtha at a temperature between about 600° and 1000° F. and at a pressure of about 100 to 3000 p. s. i. g. in the presence of hydrogen with a catalyst containing as the essential component $NiTiO_3$ which is prepared by calcining an intimate mixture of nickel carbonate and titanium oxide, the mixture containing about 2 mols of nickel per mol of titanium, and the $NiTiO_3$ being formed by heating the mixture at a temperature between about 1550° and 2000° F. for a period of about 1 to 24 hours.

References Cited in the file of this patent

UNITED STATES PATENTS

| | | |
|---|---|---|
| 2,437,532 | Huffman | Mar. 9, 1948 |
| 2,500,146 | Fleck et al. | Mar. 14, 1950 |